Figure 1:
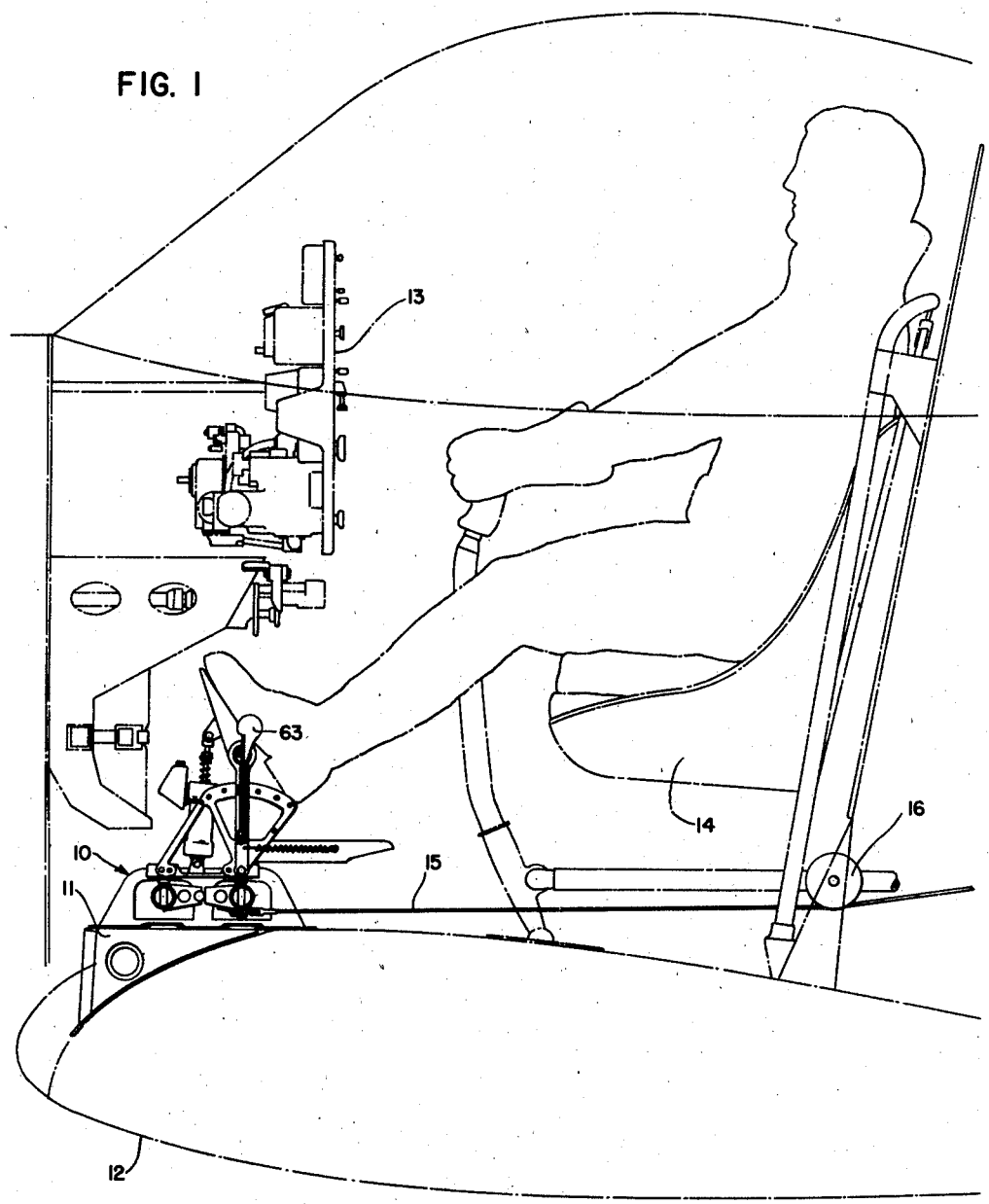

May 13, 1947.  B. G. EATON, JR., ET AL  2,420,528
RUDDER PEDAL ASSEMBLY
Filed Oct. 24, 1944   3 Sheets-Sheet 1

INVENTOR.
BRUCE G. EATON JR.
LOUIS G. RAICHE
CHARLES H. CANNON JR.
WALTER O. MEYER
BY
*George F. Goodyear*
ATTORNEY May 13, 1947.                B. G. EATON, JR., ET AL                2,420,528
                                RUDDER PEDAL ASSEMBLY
                                Filed Oct. 24, 1944                 3 Sheets-Sheet 2

INVENTOR.
BRUCE G. EATON JR.
LOUIS G. RAICHE
BY CHARLES H. CANNON JR.
WALTER O. MEYER

George F. Goodyear
ATTORNEY

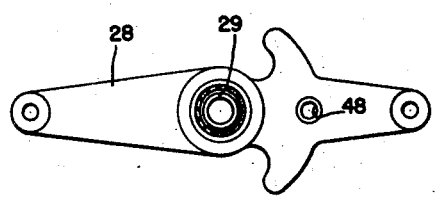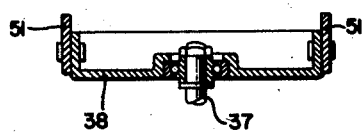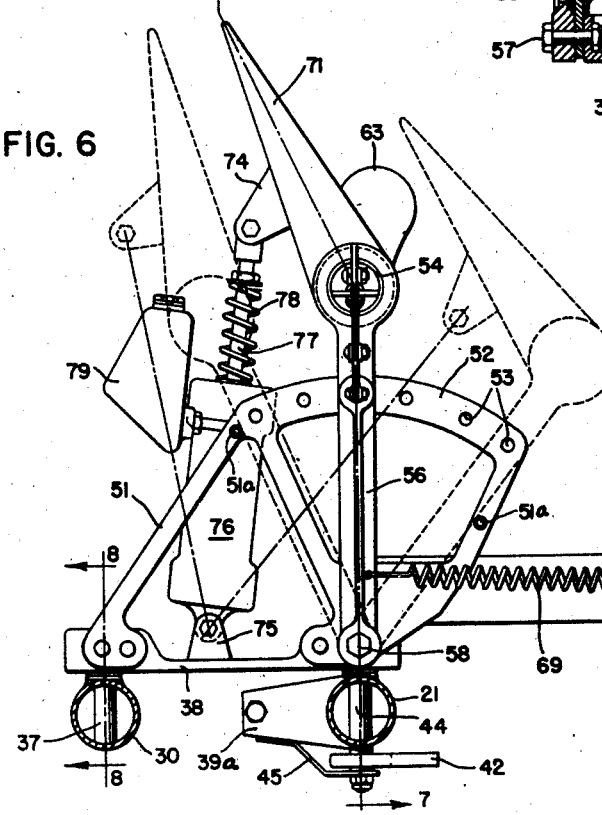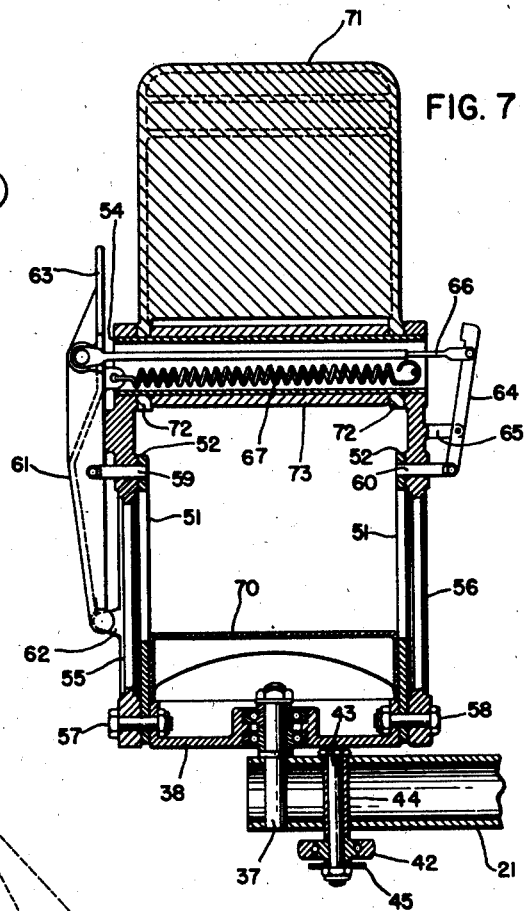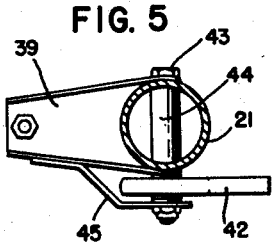

Patented May 13, 1947

2,420,528

UNITED STATES PATENT OFFICE 2,420,528

RUDDER PEDAL ASSEMBLY

Bruce G. Eaton, Jr., Bexley, and Walter O. Meyer and Charles H. Cannon, Jr., Columbus, Ohio, and Louis G. Raiche, Williamsville, N. Y., assignors to Curtiss-Wright Corporation, a corporation of Delaware Application October 24, 1944, Serial No. 560,170

6 Claims. (Cl. 74—478)

This invention relates to control mechanisms for aircraft. More particularly, this invention is directed to a foot operated control mechanism possessing novel and improved features of construction and operation.

Ordinarily the foot pedal mechanism is employed first as a control for the air rudder surface and second as means to operate the wheel brake system. If the aircraft is adapted to move on the water an additional water rudder control function is usually incorporated. Therefore, the ultimate in simplicity and operating efficiency should be the end objective.

Foot pedal control mechanisms have usually been constructed in such a manner that complicated and bulky structures result. The effect is to crowd the aircraft cockpit to the point where the pilot is unduly handicapped by lack of foot and leg room. One important reason for this condition lies in the prevailing tendency to hang or similarly support the foot operated control mechanism in various ways as from the instrument panel, by special hanger supports, upon the control pedestal, fuselage members or other portions of the aircraft structure within or immediately adjacent the cockpit. A considerable degree of complicity is also engendered by so doing and also by the pedal adjusting mechanism, the purpose of which is to accommodate differences in the leg length of different pilots.

Accordingly, it is an important object to improve upon prior arrangements for foot operated types of control mechanisms whereby an extremely simple and less cumbersome mechanism results.

It is another object to combine in a single and compact control mechanism provisions for carrying out a plurality of control functions either selectively or simultaneously as conditions require, or as may be desired.

Another object resides in the arrangement and construction of a unitary pedestal-like control which requires a minimum of space, is easily installed and may be adjusted quickly and easily to suit the requirements of the pilot of the aircraft as to foot and leg room, thereby contributing to the comfort of the pilot.

Yet another object is to devise a pedal control mechanism for aircraft which can be mounted on the floor of the cockpit, hence permitting other operating units such as flight instrument panels and the like to be arranged more advantageously.

Figure 2:
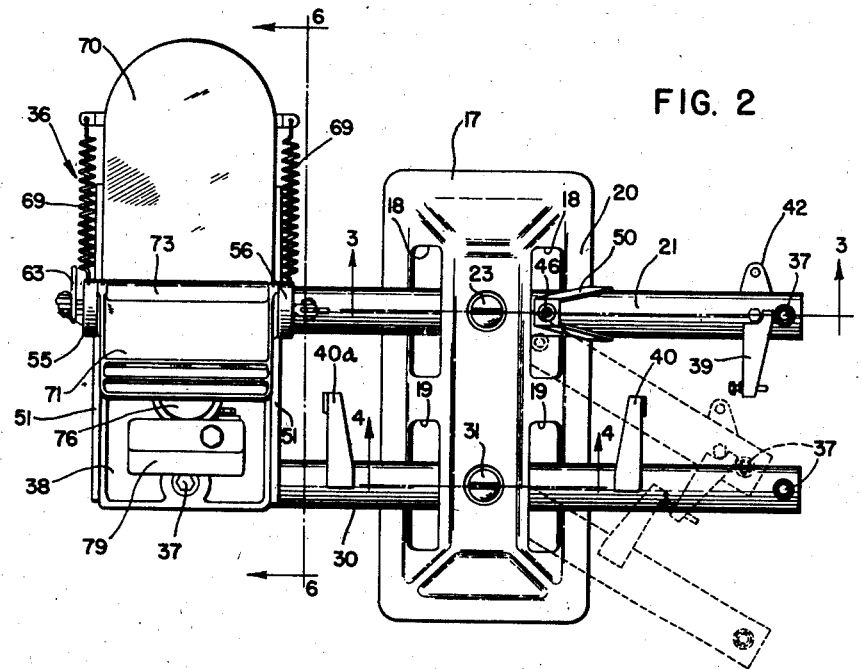
Figure 3:
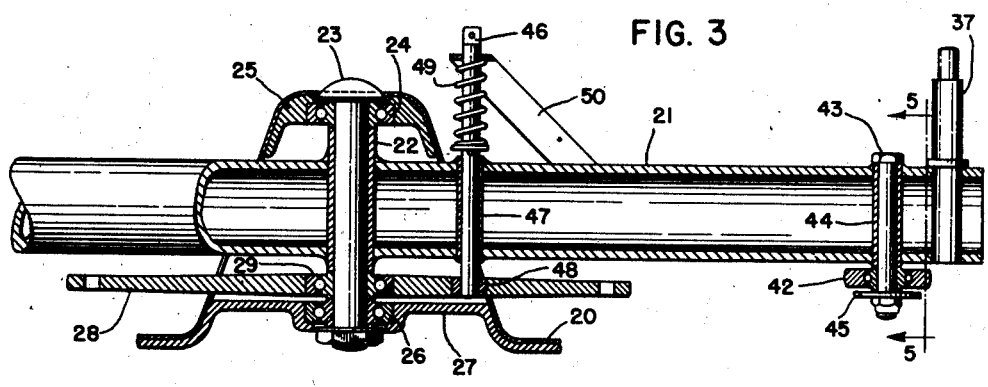
Figure 4:
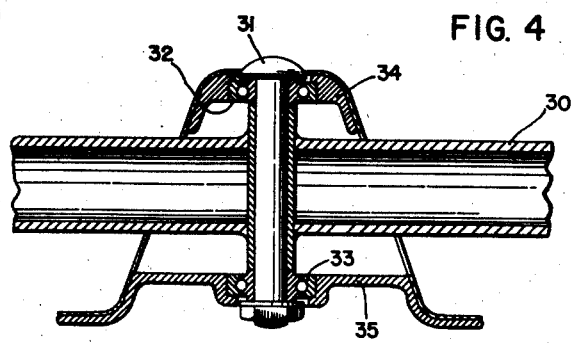

Other advantages will become obvious after a study of the following detailed description of a preferred form of the invention illustrated in the accompanying drawings, in which:

Figure 1 is a general side elevational view of an aircraft control cockpit in which the location of the present control mechanism has been indicated with respect to other units mounted therein, the advantages thereof being further emphasized by a showing of a seated pilot, Figure 2 is a top plan view of the control mechanism, one foot pedal unit being removed to reveal certain details of its construction and operation, Figure 3 is a partial sectional view in elevation of the pedestal base showing details along the line 3—3 in Figure 2, Figure 4 is a fragmentary sectional elevation showing further details at line 4—4 of Figure 2, Figure 5 is a detail view taken at line 5—5 in Figure 3, Figure 6 is a side view of a typical foot operated unit of the control mechanism as seen along line 6—6 in Figure 2, the dotted line views illustrating the possible maximum forward and rearward positions of pedal adjustment, Figure 7 is a front sectional elevational view of a foot operated unit in which the pedal adjusting mechanism has been shown, the section being taken at line 7—7 of Figure 6, Figure 8 is a sectional detail of Figure 6 as viewed along line 8—8 thereof, and Figure 9 is a top plan view of the swingable lever arm shown in connection with Figure 2.

A preferred embodiment of the present invention is illustrated generally in Figure 1. The pedestal type control mechanism shown generally at 10 is suitably mounted on the floor structure 11 of an aircraft cockpit and this floor structure may in turn be secured to or constitute a portion of the wing structure 12 which is located within the aircraft fuselage. Other features in this view include the instrument panel 13 and a pilot seat 14 together with a cable control system indicated at 15 which is positioned above the floor surface and extends from the control mechanism 10 rearwardly over suitable pulleys 16 to an air rudder surface, not shown. It will be noted that the control pedestal provides ample foot and leg room for a pilot when seated in the pilot's chair 14 and also permits a compact arrangement for the instrument panel 13 so that the pilot may have a clear and unobstructed view forwardly and to either side.

Reference will be had now to Figures 2, 3 and 4 in which the details of the preferred pedestal type control mechanism have been shown to advantage. For example, the pedestal frame 17, preferably formed of sheet material, is provided with aligned pairs of laterally opening apertures 18 and 19. In addition, a suitable floor mounting flange 20 is provided for securing the pedestal frame in position as indicated in Figure 1. A rudder bar 21 mounted to extend through the aligned apertures 18 in the base 17 is provided at its mid point with a tubular bushing 22 to receive an upright pivot post 23 thereby permitting swinging movement of the rudder bar in a generally horizontal plane. The pivot post is supported near its upper end in a suitable bearing 24 positioned in a bearing plate 25 and at the lower end in a second bearing 26 positioned in a second bearing plate 27. A lever arm 28 is also mounted on this pivot post on a suitable bearing 29 near the lower end of the pivot post and beneath the rudder bar 21. The purpose of this lever 28 will be more fully explained hereinafter. A second rudder bar 30 is positioned in the aligned apertures 19 of the base structure and extends laterally therefrom for swinging movement about a central pivot post 31, the pivot post being provided with an upper bearing 32 and a lower bearing 33 mounted respectively in bearing plates 34 and 35. It may be seen in Figures 3 and 4 that the general arrangement of pivotally mounting the parallel rudder bars 21 and 30 is substantially identical.

A foot pedal unit such as that shown at 36 in Figure 2 is mounted adjacent the opposite ends of each of the rudder bars 21 and 30 in the following manner. Near each end of each of these rudder bars a single pivot post 37 is mounted in an upright position as clearly illustrated in Figure 3. A pedal supporting frame structure 38 is then pivotally positioned on adjacent pairs of pivot posts 37 so that a parallelogram organization is formed by and between the rudder bars 21 and 30 and the pedal supporting frame structure. Only one of the pedal units 36 has been shown in Figure 2, the opposite and identical pedal unit being removed in order to illustrate more clearly the parallelogram function of this mechanism. The normal neutral position for the rudder bars is shown in full line in this figure while in dotted outline there is shown the displaced position of each of these rudder bars. It will be observed that the fore to aft alignment of the pedal frame pivot points 37 will be maintained parallel to a reference line passing through the main pivot posts 23 and 31. Hence the pedal unit 36 will always be maintained at right angles to the line of pressure applied thereto by the pilot's foot.

In order to limit the amount of swinging displacement of the rudder bars there is provided a pair of stop members 39 and 40 which are arranged to abut each other at the desired maximum point of displacement. The initial arrangement and final cooperation of the stop members 39 and 40 upon displacement of the rudder bars is clearly indicated in Figure 2. A second pair of stop members 39a (see Figure 6) and 40a (see Figure 2) are provided for limiting swinging movement of the rudder bars in the opposite direction.

Motion of the rudder bar 21 is transmitted to the cable system 15 indicated in Figure 1 by means of cable attachment members or lugs pivotally attached near the ends of this rudder bar (Figures 3 and 7). Referring in detail to Figures 3 and 5 one of these cable attachment members, for example, is illustrated at 42 as being mounted on a suitable pivot post 43 which in turn is mounted in a suitable tubular bushing 44 secured in the rudder bar 21. The cable attachment member 42 is prevented from accidental disengagement from the pivot post by the presence of a clip member 45. The clip 45 is formed with a flanged portion which is fitted over the lower end of the pivot post and also a second portion which is adapted to be welded to the under surface of the stop member 39. The last described details are shown in Figure 5. Another of these attachment lugs 42 is shown in Figures 6 and 7. No further description is necessary as this member is identical with the previous one.

The motion of the rudder bars is also utilized, if desired, for actuating a water rudder or similar directional control agency (not shown) and to carry out this purpose the lever member 28 has been mounted to rotate or swing about the rudder bar pivot 23. In Figure 3 there is shown this lever member and also means for engaging and disengaging the same with the rudder bar 21. This latter means comprises a locking pin 46 slidably mounted in a suitable tubular guide 47 in member 21 and adapted to be continuously biased in a direction to engage in an aperture 48 in lever 28 (Figure 9) by a spring element 49. The spring engages a lower transversely arranged push pin in member 46 and also a guide bracket 50 positioned near the upper or outer end of the locking pin as shown. The upper end portion of the pin is provided with suitable attachment provisions so that a pin actuating cable control means (not shown) may be attached thereto.

For a detailed disclosure of the foot pedal unit 36 reference will be had in particular to Figures 6, 7 and 8. The pedal supporting base frame 38 which is suitably mounted on the pivot post elements 37, hereinbefore noted, carries a pair of fixed side frame structures 51, each side frame being identical to that shown in Figure 6 and each of these side frames includes an upper longitudinally extending arcuate segment 52. Each of the arcuate portions 52 of these side frame members is provided with a series of suitably spaced apertures 53 for a purpose hereinafter appearing. A pedal bar 54 of tubular type is mounted on the frame structure 38 by means of a pair of side arm members 55 and 56, the side arm members each having a fixed pivot 57 and 58 respectively securing the lower ends thereof to the base frame structure 38. The foot pedal tube 54 is rigidly mounted or otherwise suitably secured in the enlarged upper ends of the side arm members in a manner clearly indicated in Figure 7. It is therefore obvious upon inspection that the pedal forming members 54, 55 and 56, which together constitute an inverted stirrup, will move as a unit about the lower pivot points 57 and 58 between the limits indicated by the forward and rearward dotted line positions of Figure 6. As a further precaution and in order to prevent over travel of the adjustable pedal stop elements 51a have been mounted in the side members 51 as shown in Figure 6.

The foot pedal just described is arranged for positional adjustment between the dotted line positions indicated in Figure 6 by means of a pair of detent elements or locking pins 59 and 60. Each of these detents is adapted to be moved into or out of engagement with any corresponding and opposite pairs of the series of spaced apertures 53 formed in the arcuate segments 52 of the side structures 51. For example, the locking pin 59 is suitably affixed to a side lever element 61, the latter being pivotally mounted at its lower end upon a boss 62 which is formed as an integral part of the member 55. This lever extends upwardly and in front of the open end of the tubular pedal bar and is further provided with an enlarged end flange or kick plate 63 for a purpose later appearing. At the opposite side of the pedal organization the locking pin 60 is also moved into or out of one of the apertures 53 by means of a lever 64 which is pivotally connected to the member 60 and is in turn adapted to pivot about a fulcrum point provided by the upstanding element 65, the latter being an integral part of the side arm member 56. In order that the levers 61 and 64 may operate concurrently to retract the detent elements in unison there is provided a connecting rod 66 which passes through the interior of the pedal bar 54 thereby connecting each of the levers as clearly indicated in Figure 7. In operation, the pilot of the aircraft is only required to apply pressure outwardly against the kick plate 63 with the side of his shoe or boot (see Figure 1) thereby pivoting the lever 61 outwardly about its fulcrum 62. This outward movement of lever automatically retracts the detent 59 and through the cross-connecting rod 66 the lever 64 is also pivoted in a direction to retract the detent element 60. Thus the pedal organization which comprises tube 54 and side arms 55 and 56 may be adjusted forwardly or rearwardly about the lower pivot elements 57 and 58 to any desired position. The foregoing description obviously applies equally well to the pedal unit at the opposite side of the control mechanism, although the latter pedal has not been shown.

In order that the pedal locking pins may be automatically returned to locking position a suitable tension spring or resilient element 67 is anchored at one end to the lever 61 and at its opposite end near the open end of pedal tube 54 as clearly shown in Figure 7. The action of this spring when the kick plate is released is to urge the upper end of lever 61 inwardly and through the connecting rod 66 to urge the upper end of lever 64 outwardly. This will automatically urge detent pins 59 and 60 toward locking position within the selected and corresponding apertures 53. It will be further observed, particularly in Figure 6, that the foot pedal organization above described is always biased toward its rearmost position, that is toward the pilot, by means of a spring element 69 which is anchored in the pivoted side arm member 56 and also to the side flange of a fixed heel plate 70. The preferred arrangement is to utilize two such springs (see Figure 2) for each pedal organization and to place the same on each side of the heel plate. The heel plate 70 is riveted or otherwise rigidly secured to the side frame members 51.

In Figures 6 and 7 the pedal control mechanism is shown as being equipped with a treadle member 71 which is pivotally mounted on the tubular member 54 by means of laterally spaced and depending ears 72 so that the treadle will pivot upon and be movable with respect to the tubular member. A scuff tube or wear resisting member 73 is positioned over the tubular bar and between the treadle pivot means 72. As indicated, the treadle is a cast plate member and is formed with a rearwardly directed boss 74, the boss being located generally intermediate the sides of the treadle. In addition to the boss 74 a second boss 75 has been provided on the frame structure 38 and a wheel brake actuating unit of hydraulic type is mounted between these boss elements. The hydraulic cylinder structure 76 of this brake unit is preferably pivoted at its lower end on boss 75 while the plunger connecting rod 77 is pivotally attached to the boss 74 on treadle 71. A spring 78 is employed to urge the plunger outwardly of the cylinder and against the direction of movement of the treadle upon application of foot pressure thereto. Furthermore, this hydraulic unit 76 is pivotally mounted in such a manner that positional adjustments of the pedal means will not produce movement of the plunger in the cylinder, but rather the treadle 71 will be moved so pivotally displaced with respect to the pedal means in order to prevent plunger movement. A study of Figure 6 will make clear these features of pedal adjustments and consequent treadle compensating motion. The hydraulic unit may be provided with a fluid reservoir such as that indicated at 79.

The foregoing description has covered in detail the improved and greatly simplified foot control mechanism herein preferred. The object has been to provide an extremely simple and easily adjusted pedal means and to incorporate a plurality of control function, viz. an air rudder control means, a supplementary water rudder or similar control which can be connected or disconnected as desired and a wheel brake control system. The effective combination and coordination of these control functions has been accomplished in a novel and improved control mechanism. Obviously changes or alterations in the present mechanism can be made without departing from the scope of this invention as will be defined in the appended claims.

What is claimed is:

1. The combination in a foot pedal control mechanism of a base structure, a pair of laterally extending pedal supporting bars arranged in spaced relation and pivotally mounted at their mid points on said base structure, a pedal frame positioned at each side of said base upon the adjacent ends of said pair of bars whereby the said bars and pedal frames combine to form a parallelogram system, pedal means mounted on each pedal frame whereby said system may be pivoted in either direction from a neutral position upon application of foot pressure to one or the other of said pedal means, a control system connected to one of said pair of pedal supporting bars, a treadle plate pivoted on each pedal means for movement with respect thereto, and a control means associated with said treadle plates for operation upon movement of said treadle plates relative to said pedal frames.

2. In a pedal control unit, a base, a pair of pedal elements, and adjustable means accommodating differences in leg length of different operators for connecting the pedal elements to said base and to each other while constraining them in horizontal swinging motion about the base to positions parallel to each other, said means comprising a pair of laterally extending pedal supporting bars pivoted at their mid points on longitudinally spaced upright axes to said base, a pedal frame on each side of the base pivoted on longitudinally spaced upright axes to adjacent ends of said bars whereby said bars and pedal frames form a parallelogram system, and pivot means on each of said pedal frames connecting one of the pedal elements thereto with the axes of the two pivot means substantially parallel to each other and to the plane of swinging movement of said bars.

3. In a pedal control unit, a base, a rudder bar pivoted at a mid point and on an upright axis to the base, a pair of pedal frames pivoted to end portions of the bar on upright axes, a pedal element adjacent each frame, means pivoted on a transverse horizontal axis connecting each pedal element to the adjacent frame for longitudinal adjustment relative to the base, and means for constraining the pedal frames to positions wherein the axes of said pivoted means are substantially parallel.

4. In a foot pedal unit, a frame structure having a pair of spaced side members, pedal means pivoted to the frame structure for adjusting movement along the side members to various positions therebetween, a pair of locking devices, each of said devices being adapted to lock one of said side members to the pedal means, and a common actuator for said devices for effecting simultaneous release of them.

5. In a pedal control mechanism, a pedal frame mounted for fore and aft movement, a pedal element pivoted on a transverse axis to said frame and having pivoted thereto on a parallel axis a treadle member, means for adjustably securing the pedal element to the frame in various angular positions about said transverse axis, and a fluid control unit constituting a link pivoted at one end to said treadle at a point spaced from said parallel axis and pivoted at the other end to said frame at a point spaced from said transverse axis, said control unit supporting said treadle member in a position accessible to the operator when the pedal element is adjusted to various angular positions.

6. In a pedal control mechanism, a base, a bar pivoted medially of its ends to the base on an upright axis, a pedal support pivoted on an upright axis to each end portion of the bar, a pedal element mounted for longitudinal adjustment on each pedal support, said pedal elements each having a transversely extending foot engaging surface, and means for maintaining said pedal elements with their foot engaging surfaces in parallel relation to each other in all positions of longitudinal movement and adjustment thereof comprising a second bar pivoted on upright axes to said base and to each pedal support, the pivots of the second bar all being substantially equally spaced from and substantially longitudinally aligned with the adjacent pivots of the first mentioned bar.

BRUCE G. EATON, Jr.
WALTER O. MEYER.
CHARLES H. CANNON, Jr.
LOUIS G. RAICHE.

REFERENCES CITED

The following references are of record in the file of this patent:

UNITED STATES PATENTS

| Number | Name | Date |
|---|---|---|
| 1,919,520 | Laddon | July 25, 1933 |
| 1,774,558 | Laddon | Sept. 2, 1930 |
| 2,134,509 | Frank | Oct. 25, 1938 |
| 1,157,140 | Anderson | Oct. 19, 1915 |
| 1,833,635 | Carlton | Nov. 24, 1931 |
| 2,048,448 | Hofer | July 21, 1936 |
| 1,745,501 | McCauley | Feb. 4, 1930 |
| 1,862,280 | Sanford | June 7, 1932 |
| 2,334,504 | Perina | Nov. 16, 1943 |